United States Patent
Rottenstreich et al.

(10) Patent No.: US 9,672,239 B1
(45) Date of Patent: Jun. 6, 2017

(54) EFFICIENT CONTENT ADDRESSABLE MEMORY (CAM) ARCHITECTURE

(71) Applicant: Marvell Israel (M.I.S.L) Ltd., Yokneam (IL)

(72) Inventors: Ori Rottenstreich, Kiriat Motzkin (IL); Aviran Kadosh, Misgav (IL); Carmi Arad, Nofit (IL); Yoram Revah, Akko (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 266 days.

(21) Appl. No.: 14/055,593

(22) Filed: Oct. 16, 2013

Related U.S. Application Data

(60) Provisional application No. 61/714,576, filed on Oct. 16, 2012.

(51) Int. Cl.
*G06F 17/30* (2006.01)
*H04L 29/12* (2006.01)
*H04L 12/26* (2006.01)
*H04L 12/743* (2013.01)

(52) U.S. Cl.
CPC .... *G06F 17/30371* (2013.01); *H04L 43/0876* (2013.01); *H04L 43/0894* (2013.01); *H04L 45/7457* (2013.01); *H04L 61/2514* (2013.01)

(58) Field of Classification Search
CPC ......... G06F 17/30985; G06F 17/30982; G11C 15/00; H04L 69/324; H04L 45/7453; H04L 45/00; H04L 49/10; H04L 45/7457; H04L 47/20; H04L 43/0876; H04L 43/0894; H04L 43/028; H04L 45/60; H04L 47/2441; H04L 61/2514
See application file for complete search history.

(56) References Cited

U.S. PATENT DOCUMENTS

| | | | |
|---|---|---|---|
| 6,358,654 B1* | 3/2002 | Ito | G03G 9/097 399/297 |
| 6,467,019 B1* | 10/2002 | Washburn | G06F 17/30982 365/168 |
| 7,392,349 B1* | 6/2008 | Mathur | G11C 15/00 711/108 |

(Continued)

OTHER PUBLICATIONS

Pinky M S et al., "Secure Multimatch Packet Classification Based on SignatureTree",International Journal of Computer Science and Information Technologies, vol. 6 (2), 2015, 1677-1679.*

(Continued)

*Primary Examiner* — Srirama Channavajjala

(57) ABSTRACT

A TCAM database is partitioned into a plurality of sections. A set of rules to be stored in the TCAM database is analyzed to identify respective subsets of rules that match respective possible bit value combinations corresponding to a subset of bits in the rules, and to identify, in the subsets of rules, two or more subsets that share one or more rules. Then, it is determined whether two or more subsets that include shared rules can be written to a same section in the TCAM database, without exceeding a maximum number of rules that can be written to the same section, when one or more duplicates of one the the shared rules is omitted from the TCAM database. When it is determined that two or more subsets can be written to the same section, the two or more subsets are written to the same section in the TCAM database.

19 Claims, 12 Drawing Sheets

(56) References Cited

U.S. PATENT DOCUMENTS

| | | | | |
|---|---|---|---|---|
| 7,760,733 B1* | 7/2010 | Eiriksson | H04L 69/12 | 370/392 |
| 8,619,562 B1* | 12/2013 | Krivitski | H04L 69/22 | 370/230 |
| 8,937,945 B2* | 1/2015 | Kompella | H04L 41/5019 | 370/389 |
| 8,964,542 B1* | 2/2015 | Krivitski | H04L 69/22 | 370/230 |
| 2002/0036912 A1* | 3/2002 | Helwig | G11C 15/04 | 365/49.17 |
| 2005/0013293 A1* | 1/2005 | Sahita | H04L 45/7453 | 370/389 |
| 2006/0104286 A1* | 5/2006 | Cheriton | G06F 17/30949 | 370/395.32 |
| 2006/0122989 A1* | 6/2006 | Kurupati | G06F 17/30595 | |
| 2006/0262583 A1* | 11/2006 | Venkatachary | H03M 7/30 | 365/49.17 |
| 2007/0094441 A1* | 4/2007 | Kim | G11C 15/00 | 711/108 |
| 2008/0046423 A1* | 2/2008 | Khan Alicherry | G06F 17/30985 | |
| 2008/0050569 A1* | 2/2008 | Tixhon | C03C 17/3417 | 428/216 |
| 2008/0140661 A1* | 6/2008 | Pandya | G06F 9/444 | |
| 2009/0125470 A1* | 5/2009 | Shah | H04L 63/0263 | 706/47 |
| 2009/0207838 A1* | 8/2009 | Milliken | G06F 15/16 | 370/389 |
| 2010/0067535 A1* | 3/2010 | Ma | H04L 43/028 | 370/401 |
| 2010/0100671 A1* | 4/2010 | Singh | H04L 45/7453 | 711/108 |
| 2011/0141894 A1* | 6/2011 | Breslin | H04L 67/327 | 370/235 |
| 2011/0161580 A1* | 6/2011 | Shah | H04L 49/10 | 711/108 |
| 2011/0276752 A1* | 11/2011 | Kishore | H04L 45/7457 | 711/108 |
| 2012/0134360 A1* | 5/2012 | Du | H04L 43/028 | 370/392 |
| 2012/0137060 A1* | 5/2012 | Akerib | G11C 15/00 | 711/105 |
| 2012/0163392 A1* | 6/2012 | Park | H04L 45/60 | 370/401 |
| 2012/0275466 A1* | 11/2012 | Bhadra | H04L 47/2441 | 370/419 |
| 2015/0039823 A1* | 2/2015 | Chen | G06F 17/30982 | 711/108 |
| 2016/0342510 A1* | 11/2016 | Pani | G06F 12/0615 | |
| 2016/0380885 A1* | 12/2016 | Jani | H04L 43/0876 | 370/408 |

OTHER PUBLICATIONS

Zahid Ullah et al., "Vertically Partitioned SRAM-Based Ternary Content Addressable Memory", IACSIT International Journal of Engineering and Technology, vol. 4, No. 6, Dec. 2012, pp. 760-764.*

Chad R.Meiners et al., "Algorithmic Approaches to Redesigning TCAM-Based Systems",SIGMETRICS'08, Jun. 2-6, 2008, pp. 1-2.*

Rottenstreich et al., "On the Code Length of TCAM Coding Schemes," in IEEE ISIT, 5 pages, 2010.

Rottenstreich et al., "On Finding an Optimal TCAM Encoding Scheme for Packet Classification", IEEE Infocom, 9 pages, 2013.

Rottenstreich et al., "Exact Worst-Case TCAM Rule Expansion", IEEE Trans. Computers, vol. 62, No. 6, 13 pages, 2013.

Zane et al., "CoolCAMs: Power-Efficient TCAMs for Forwarding Engines", IEEE Infocom, 11 pages, 2003.

* cited by examiner

| LOOKUP ENTRY | SEGMENT ID |
|---|---|
| 000....000 | 0 |
| 000....001 | 1 |
| ... | ... |
| 111....110 | $2^K-1$ |
| 111....111 | $2^K$ |

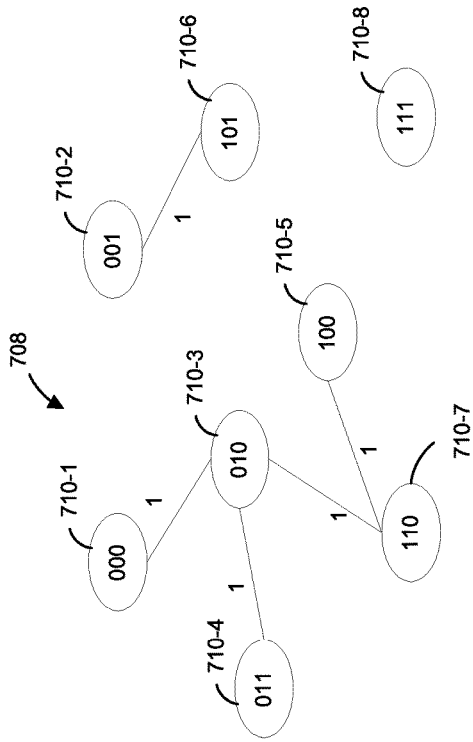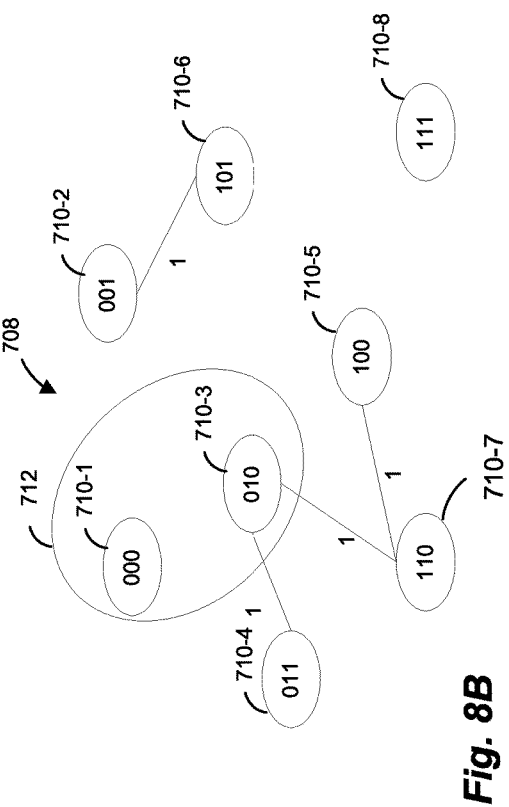
Fig. 8A
Fig. 8B

EFFICIENT CONTENT ADDRESSABLE MEMORY (CAM) ARCHITECTURE

CROSS-REFERENCES TO RELATED APPLICATION

The present application claims the benefit of U.S. Provisional Application No. 61/714,576, entitled "ALGORITHMIC TCAM ARCHITECTURE," filed on Oct. 16, 2012, which is hereby incorporated by reference herein in its entirety.

FIELD OF TECHNOLOGY

The present disclosure relates generally to content addressable memories, and more particularly, to content addressable memories used in network devices.

BACKGROUND

A content addressable memory (CAM) is a type of computer memory that allows for high speed searches of a specific data pattern stored within its memory cells, which are organized as an array having rows and columns. A different data pattern typically is stored in each row of the CAM. Data to be checked is supplied to an input of the CAM, and the CAM then in a single compare cycle operation compares the input to multiple rows of the CAM array. If the CAM determines that the input matches one or more rows, the CAM returns a signal indicating the row or rows that match the input data. Typically, if more than one row matches the input data, the CAM returns a signal indicating only one of the matching rows based on some priority scheme. For example, the highest matching row in the CAM is indicated.

Because each entry of a CAM device is typically checked in parallel in a lookup operation, CAM devices are well suited for applications in which high speed lookups are needed or required. For example, in the context of network switching, CAM devices are often utilized for high throughput packet forwarding and classification operations. However, typical CAM devices are expensive in terms of power consumption and large area typically associated with such devices.

SUMMARY

In an embodiment, a method for operating a ternary content addressable memory (TCAM) database in a network device includes partitioning the TCAM database into a plurality of sections, the sections being configured to store rules that are used for processing packets at the network device. The method also includes identifying, in a set of rules to be stored in the TCAM database, respective subsets of rules that match respective possible bit value combinations corresponding to a subset of bits in each of at least some of the rules, and identifying, in the subsets of rules, two or more subsets that include one or more shared rules. The method further includes determining whether two or more subsets that include one or more shared rules can be written to a same section in the TCAM database, without exceeding a maximum number of rules that can be written to the same section, when one or more duplicates of at least one of the shared rules is omitted from the TCAM database. The method additionally includes, when it is determined that two or more subsets can be written to the same section, writing the two or more subsets to the same section in the TCAM database.

In another embodiment, a network apparatus comprises a plurality of ports, a packet processor coupled to the plurality of ports, the packet processor configured to process packets received via at least some of the ports, wherein the packet processor comprises a ternary content addressable memory (TCAM) rules database to store rules for processing packet, wherein the TCAM database is partitioned into a plurality of sections, and a processing unit coupled to the packet processor. The processing units is configured to identify, in a set of rules to be stored in the TCAM database, respective subsets of rules that match respective possible bit value combinations corresponding to a subset of bits in each of at least some of the rules, and identify, in the subsets of rules, two or more subsets that include one or more shared rules. The processing unit is further configured to determine whether two or more subsets that include one or more shared rules can be written to a same section in the TCAM database, without exceeding a maximum number of rules that can be written to the same section, when one or more duplicates of at least one of the shared rules is omitted from the TCAM database. The processing unit is additionally configured to, in response to determining that two or more subsets of rules can be written to the same section, write the two or more subsets of rules into the same section in the TCAM database.

BRIEF DESCRIPTION OF THE DRAWINGS

FIG. 3 is a block diagram of an example index table 250, according to an embodiment;

FIGS. 8A-8G illustrate respective operations of a method for distributing a set of rules among one or more segments of a rules database, according to an embodiment.

DETAILED DESCRIPTION

Figure 1:
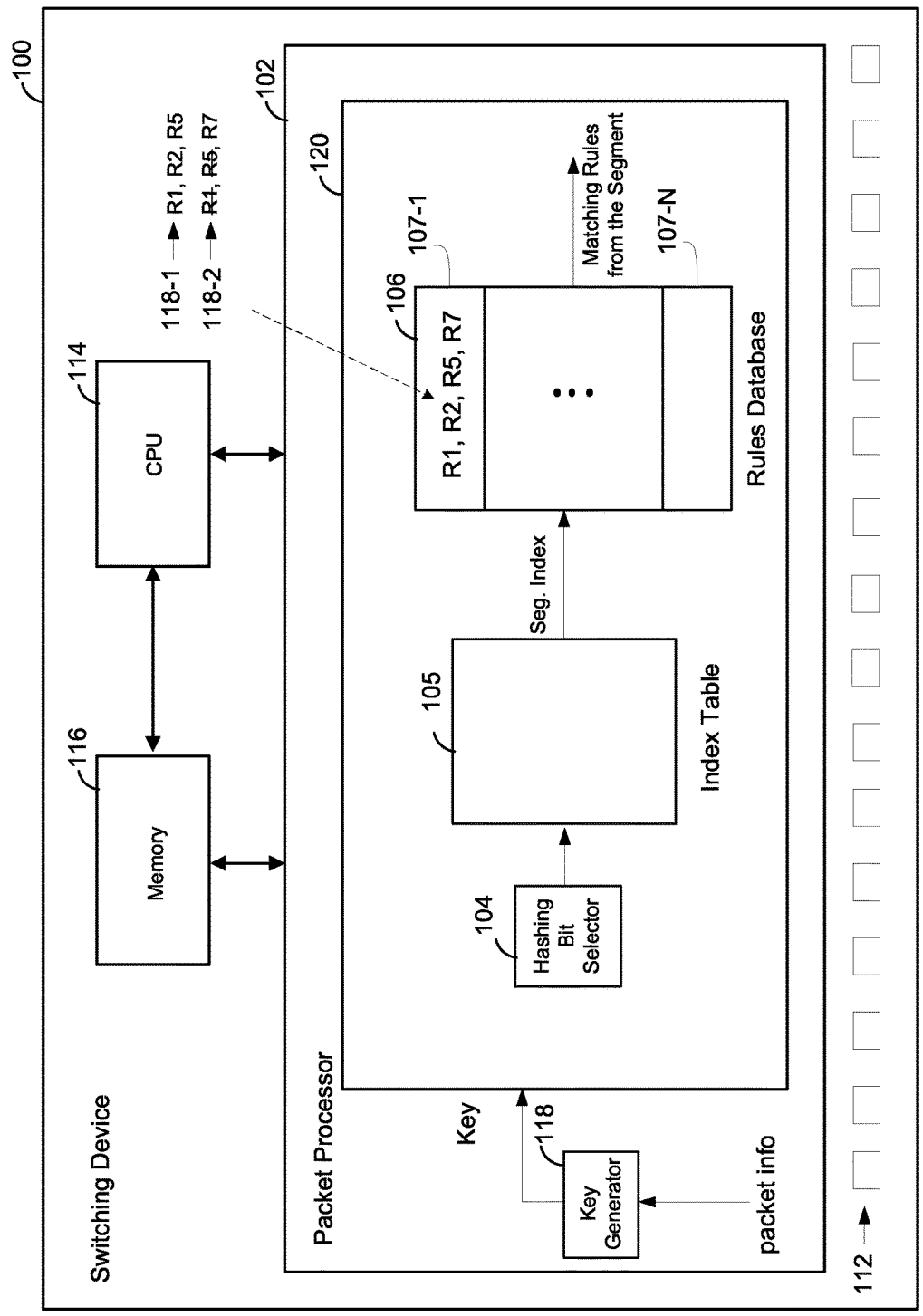
FIG. 1 is a simplified block diagram of an example switching device that includes an embodiment of a content addressable memory (CAM) system configured in accordance with an embodiment of the present disclosure.

FIG. 1 is a simplified block diagram of an example switching device 100 that includes a content addressable memory (CAM) system 120 to be described in more detail below, according to an embodiment of the present disclosure. The switching device 100 is generally a computer networking device that connects two or more computer systems, network segments, subnets, and so on. For example, the switching device 100 is a router, in one embodiment. It is noted, however, that the switching device 100 is not necessarily limited to a particular protocol layer or to a particular networking technology (e.g., Ethernet). For instance, the switching device 100 could also be a bridge, a VPN concentrator, or any other suitable network device that utilizes a CAM memory.

The switching device 100 includes a packet processor 102 coupled to a plurality of ports 112, and each of the ports 112 is coupled to a communication network and/or to another suitable network device within a communication network. In general, the packet processor 102 is configured to process packets received via ingress ports 112, to determine respective egress ports 112 via which the packets are to be transmitted, and to transmit the packets via the determined egress ports 112 to a receiving device. In at least some embodiments, the packet processor 102 is configured to provide additional processing functionalities, such as network security functions, packet filtering functions, traffic monitoring functions, etc. The switching device 200 also includes a central processing unit (CPU) 114 coupled to the packet processor 102. The CPU 114 is configured to execute machine readable instructions stored in a memory 116, in an embodiment.

The packet processor 102 includes the CAM system 120, in an embodiment. Generally speaking, the CAM system 120 receives a key corresponding to a packet and checks whether the key matches any rule in a set of rules stored in the CAM system 120. When a match is detected, the CAM system 120 generates data that indicates one or more actions to be taken with respect to the packet. Examples of actions to be taken include forwarding the packet to a port 112 for transmission to a destination network device via the port 112, forwarding the packet to another processing unit within the packet processor 102 for further processing of the packet, dropping the packet, mirroring the packet to the CPU 114 and/or to the memory 116, trapping the packet in the CPU 114 and/or to the memory 116, changing one or more field in the packet header, etc., in various embodiments.

The CAM system 120 includes a rules database 106 that stores a set of rules for processing packets. The rule database 106 is partitioned into a plurality of segments 107, and different subsets of rules are stored in different ones of the segments 107, in an embodiment. The terms "segments" and "sections" as used herein are used interchangeably to generally refer to partitions of a database. In an embodiment, the CAM system 120 is physically partitioned into segments of a particular size, for example by assigning a portion of entries of the CAM to correspond to a particular segment 107. In some embodiments, the CAM system 120 is statically or dynamically partitioned into logical segments 107, for example by statically or dynamically allocating portions of the CAM to the segments 107.

In an embodiment, to perform a lookup based on a key, the CAM system 120 first identifies a segment 107 in which to search for the key, and then searches entries of the identified segment 107 to check if any of the entries in the identified segment 107 match the key. That is, the CAM system 120 searches only one segment 107 for the key, without searching the other segments 107 for the key, in this embodiment. Accordingly, a lookup operation searches only a subset of entries of the rules database 106, i.e., the subset of entries corresponding to only one segment 107 of the rules database 106, in this embodiment. Because a lookup operation searches only a subset of entries of the rules database 106, power consumed by the database 106 during the lookup operation is reduced compared to systems in which the entire rules database is searched in every search operation, in at least some embodiments.

In an embodiment, a segment 107 in which a rule is stored in the database 106 is determined based on values of a fixed subset of bits in the rule. In operation, the CAM system 120 uses values of a corresponding fixed set of bits in a key to hash to a particular segment 107 in which to search for the key. For convenience, the fixed set of bits is sometimes referred to herein as "hashing bits," and corresponding bit indices are sometimes referred to herein as "hashing bit indices." In the embodiment of FIG. 1, the CAM system 120 includes a hashing bit selector 104 and an index table 105. The index table 105 indicates a correspondence between possible combinations of the hashing bits in a key and a segment 107 in which to search for the key. The hashing bit selector 104 extracts the hashing bits from a key, and the extracted hashing bits are used to access the index table 105 to identify a segment 107 in which to search for the key.

In an embodiment, the rules database 106 is a ternary CAM (TCAM) device configured to store don't care bits, in addition to logic zero ("0") bits and logic one ("1") bits. Because a don't care bit in a rule is matched by a value of either "0" or "1" of a corresponding bit in a key, certain rules need to be duplicated in multiple ones of the segments 107, in some situations. For example, a rule with a don't care hashing bit needs to be placed in a first segment 107 that corresponds to the value of 0 of the hashing bit and in a second segment 107 that corresponds to the value of 1 of the hashing bit. Generally speaking, a rule with t don't care hashing bits needs to be stored in each one of $2^t$ segments 107, in some situations. Thus, the size of the database 106 needed to store a set of rules may be larger compared to a size of a monolithic system in which the entire database is searched for every key, in such situations. In various embodiments, the CAM system 120 is configured to reduce or eliminate the number of duplications needed to store a set of rules in the database 106 by analyzing the set of rules to efficiently select hashing bit indices used for distributing the set of rules in the segments 107 and/or by storing related subsets of rules in the same ones of the segments 107, as will be explained in more detail below. Efficiently storing a set of rules in the rules database 106 by reducing or eliminating the number of duplications of rules in the database 106 reduces the size of the database 106 needed to store the set of rules (e.g., by reducing the number of segments 107 needed for storing the set of rules), in at least some embodiments.

According to an embodiment, the CPU 114 executes machine readable instructions to configure the CAM device 120 as described herein to efficiently distribute a set of rules among one or more segments 107 of the rules database 106. In an embodiment, the CPU 114 analyzes the set of rules to efficiently select hashing bit indices according to which to distribute the rules. The CPU 114 then analyses the set of rules to identify respective subsets of rules that match different possible combinations of values of the hashing bits in the rules, in an embodiment. Then, the CPU 114 identifies subsets of rules that have one or more shared rules, and places the subsets of rules that have one or more shared rules in the same one of the segments 107. Because the subsets of rules that have one or more shared rules are stored in the same segment 107, the shared rules need not to be duplicated in the segments 107. Accordingly, the CPU 114 places the identified subsets rules that include shared rules without duplicating the shared rules, reducing or eliminating the number of duplications needed to store the set of rules in the database 106. As an example, FIG. 1 illustrates placement of two subsets 118-1, 118-2 having shared rules R1 and R5 in the rules database 106, in an example scenario. As illustrated in FIG. 1, the CPU 114 places both of the subsets 118-1, 118-2 in the segment 107-1 of the rules database 106 without duplicating the shared rules R1 and R5 in the rules database 106 (i.e., storing only one copy of each of the shared rules R1 and R5 in the segment 107-1 of the rules database 106).

A key utilized by the CAM system 120 is generated based on information included in and/or otherwise associated with a packet, in an embodiment. For example, a key generator 118 of the switching device 100 generates a key for a packet using information in a header of the packet, in some embodiments. In some embodiments, the key generator 118 includes, in a key for a packet, information generated for the packet during processing of the packet by the packet processor 102. In an embodiment, the CAM system 120 includes a rules selection logic (not shown) for selecting a rule in an event that more than one rule matches the key. When multiple rules are matched by a key, the selection logic selects a rule according to a priority scheme, for example, in an embodiment. For example, the selection logic selects a rule having the highest priority of the rules matched by the key, a rule having the lowest address of the rules matched by the key, etc., in various embodiments. Upon identifying and/or selecting a rule that matches the key, the CAM system 120 generates data that indicates one or more actions that should be taken with respect to the packet associated with the key, in an embodiment.

In some embodiments, the packet processor 102 is configured to receive a packet at an ingress port 112, to store the packet in a memory, to perform processing of the packet or a data unit associated with the packet, such as a packet descriptor described below, while the packet is stored in the memory, to determine one or more egress ports 112 via which the packet should be transmitted, and, after making the forwarding decision, to retrieve the packet from the memory and transmit the packet via the one or more egress ports 112. In some embodiments, the packet processor 102 generates a packet descriptor for the packet, and the packet descriptor, rather than the packet itself, is subsequently processed by the packet processor 102. A packet descriptor includes some information from the packet, such as some or all of the header information of the packet, in an embodiment. In some embodiments, the packet descriptor additionally includes other information such as an indicator of where in the memory the packet is stored. For ease of explanation, the term "packet" as used herein is used to refer to a packet itself or to a packet descriptor associated with the packet.

In some embodiments, the rules to be stored in the rules database 107 are encoded using a suitable coding method and the encoded rules are stored in the rules database 107. For example, TCAM rules (i.e., rules that include don't care bits, in some situations) are encoded in a binary-mode memory, such as static random access memory (RAM), dynamic random access memory (DRAM), or any other suitable binary-mode memory, in some embodiments. In some such embodiments, a set of rules is encoded and the encoded set of rules is analyzed by the CPU 114 to select hashing bit indices and/or to distribute the rules according to the hashing bit indices.

Figure 2:
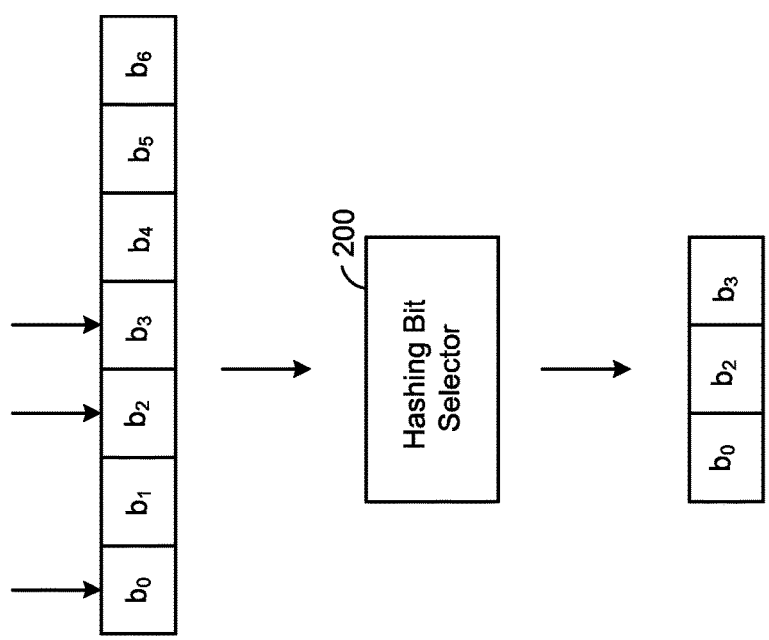
FIG. 2 is a block diagram of a hashing bit selection unit, according to an embodiment.

Turning briefly to FIG. 2, one embodiment of a hashing bit selection unit 200, the same as or similar to the bit selection unit 104 of FIG. 1 is shown. In the example embodiment of FIG. 2, the bit selection unit 200 receives a six bit key and extracts three bits at bit indexes b0, b2 and b3 from the key. The bit selection unit receives a key having a suitable length other than six bits and/or is configured to extract a subset of bits having suitable lengths other than three bits, in other embodiments. Generally speaking, the hashing bit selection unit 200 receives a key having W bits and extracts k bits from the key, wherein k and W are positive integers, and wherein k is less than or equal to W, in various embodiments.

FIG. 3 is a block diagram of an example index table 250, according to an embodiment. The index table 250 is suitable for use as the index table 105 of FIG. 1, in an embodiment. The index table 250 indicates a correspondence between possible combinations of a set of hashing bits in a key and a segment in a rules database, such as the rules database 107 of FIG. 1, in which to search for the key. The index table 250 includes $2^k$ entries corresponding to k hashing bits extracted from a key. Each entry of the index table 250 includes a pointer to a particular segment 107 of the rules database 106, in an embodiment. At least some of the entries of the index table 250 include a pointer to a same one of the segments 107 of the rules database 106, in some embodiments.

Figure 4:
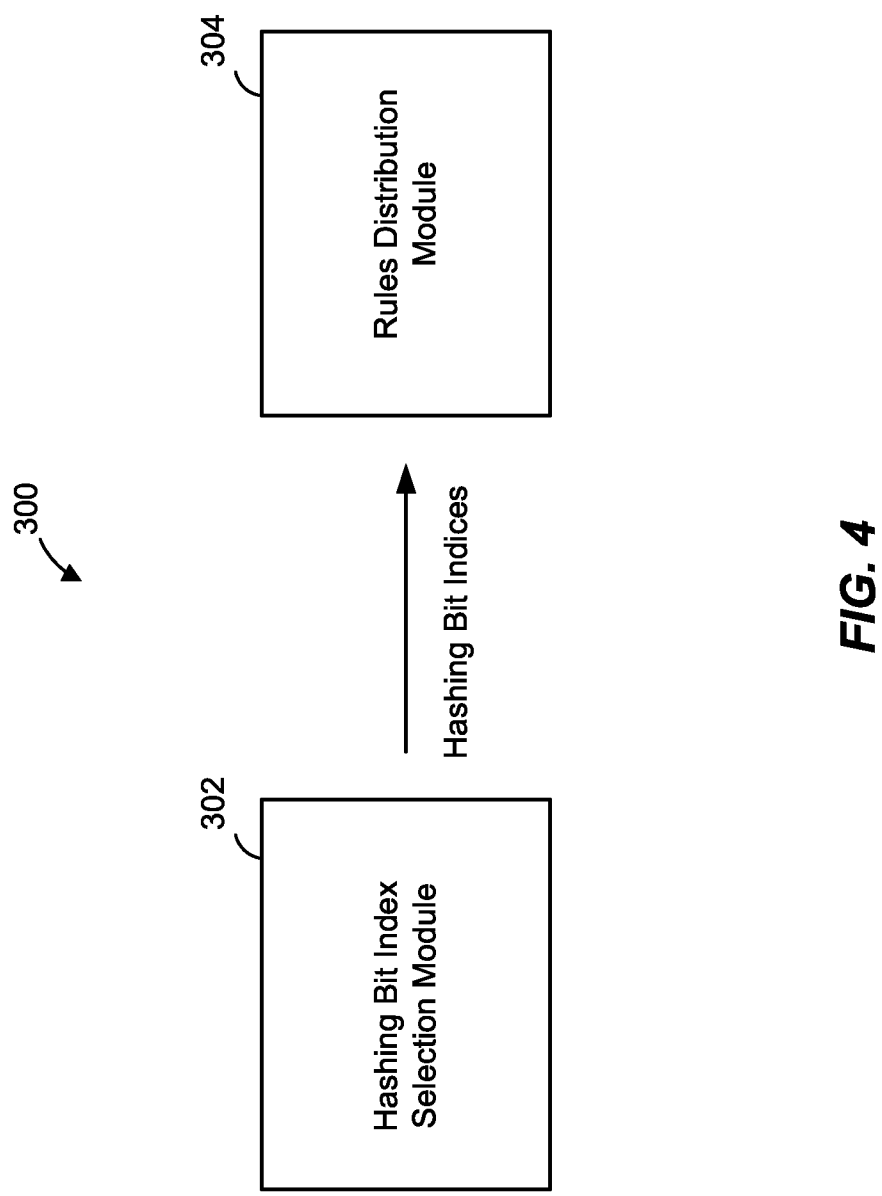
FIG. 4 is a block diagram of a system for configuring a CAM device, according to an embodiment.

FIG. 4 is a block diagram of a system 300 for configuring a CAM device, such as the CAM device 120 of FIG. 1, according to an embodiment. The system 300 includes a hashing bit index selection module 302 and a rules distribution module 304, and each of the module 302, 304 includes computer-readable instructions stored on a computer-readable memory (or media), such as the memory 116, executable by a processor coupled to the memory, such as the CPU 114. For the purposes of clarity, the system 300 will be discussed below with reference to the switching device 100 of FIG. 1, and more particularly with reference to the CPU 114 of FIG. 1. It is understood, however, that the system 300 need not be implemented by the switching device 100 in general or by the processor 114 in particular. The system 300 is implement by a component other than the CPU 114 of the switching device 100 or is implemented by a device other the switching device 100, in some embodiments. Also, the switching device 100 implements systems other than the system 300 to configure the CAM device 120, in some embodiments.

Generally speaking, the bit selection module 302 analyses a set of rules to select bit indices for a subset of bits according to which to efficiently distribute the set of rules among one or more segments 107 of the rules database 106. Then, the rules distribution module 304 analyses the set of rules using the hashing bit indexes selected by the module 302 to efficiently place the set of rules in one or more segments 107 of the rules database 106. Several example embodiments of the bit selection module 302 are first described below with reference to FIGS. 5-7. Then, an example embodiment of the rules distribution module 304 is described with reference to FIGS. 8A-8G.

Figure 5:
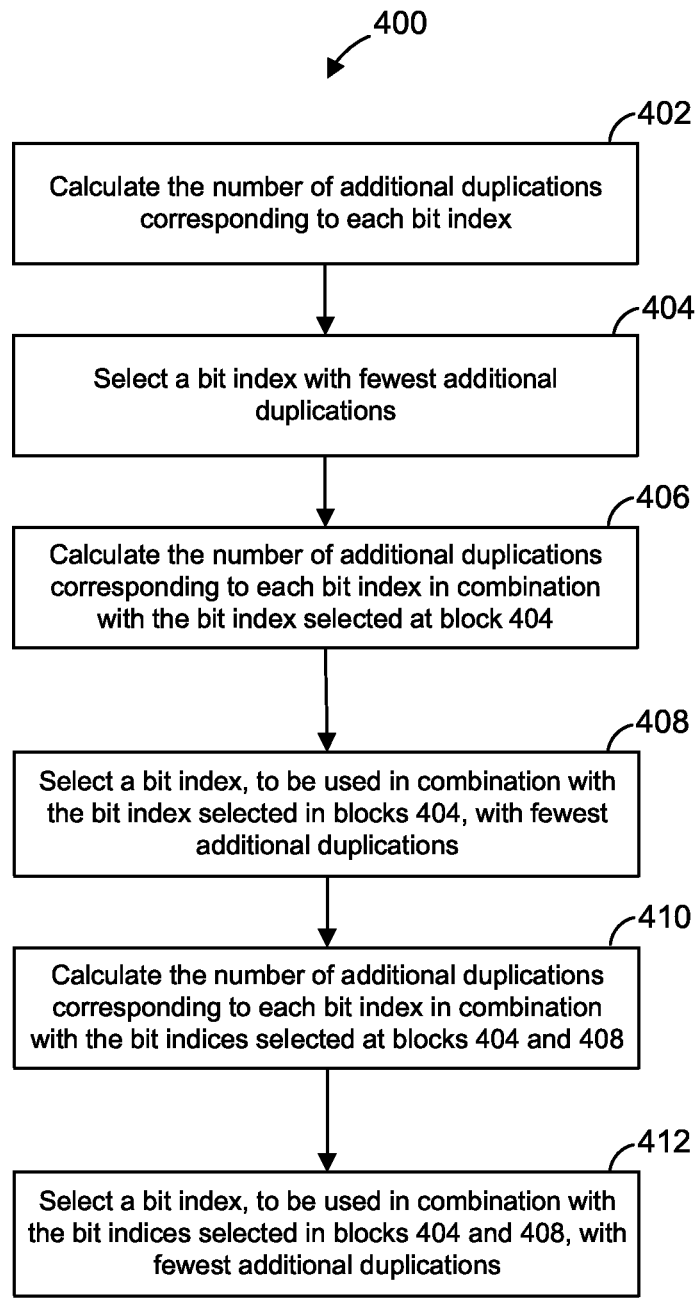
FIG. 5 is a flow chart of a method for selecting, based on a set of rules, bit indices of a subset of bits to be used as hashing bits for storing the set of rules, according to an embodiment.
Figure 6:
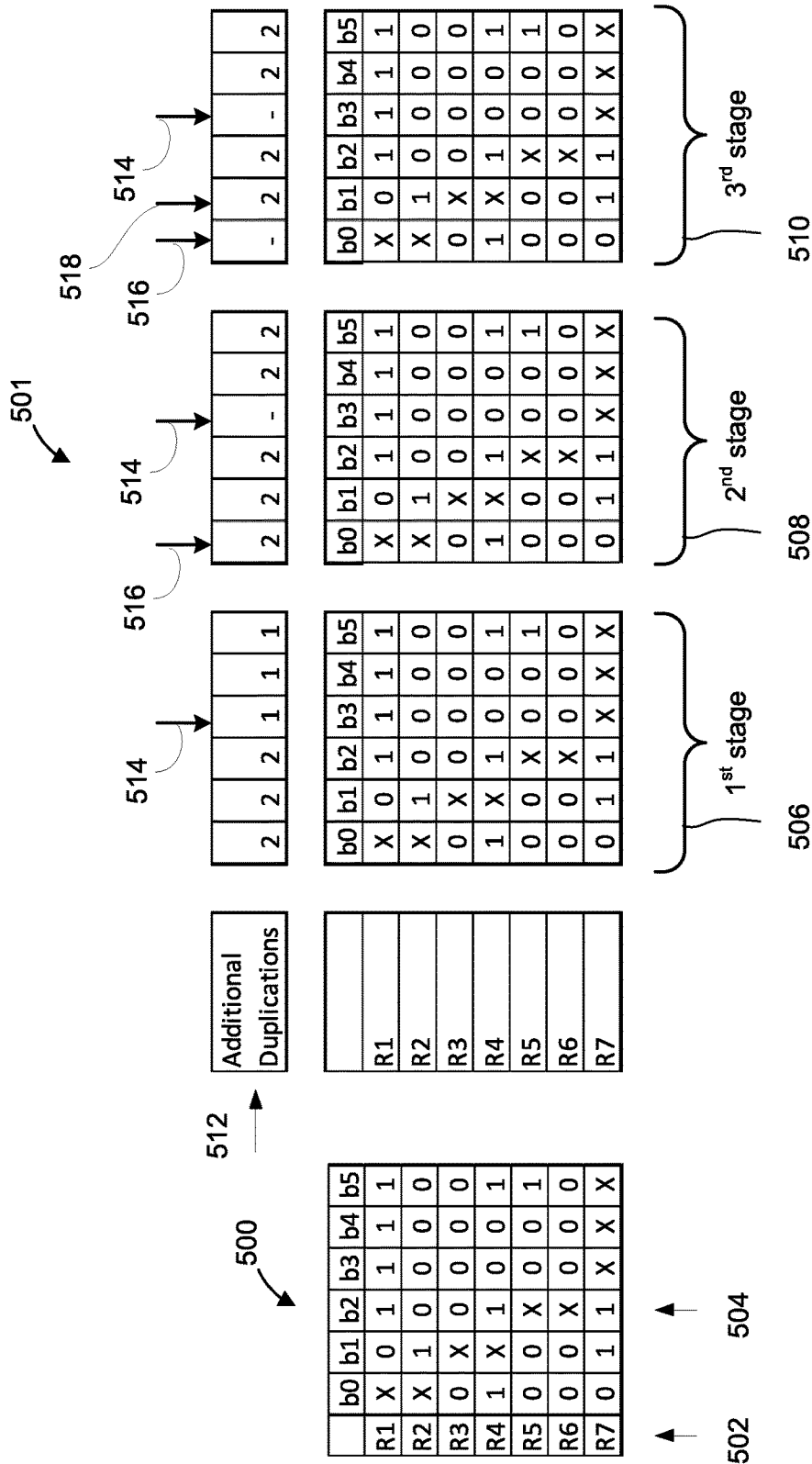
FIG. 6 illustrates an example set of rules and an example process for selecting hashing bit indices based on the set of rules, according to an embodiment.

FIG. 5 is a flow chart of a method 400 for selecting, based on a set of rules, bit indices of a subset of bits to be used as hashing bits for storing the set of rules, according to an embodiment. In an embodiment, the method 400 is implemented by the hashing bit index selection module 302 of FIG. 4. In an embodiment, the method 400 implements a greedy algorithm having several stages, wherein a single hashing bit index is selected in each one of the stages. FIG. 6 illustrates an example set of rules 500 and an example process 501 for selecting hashing bit indices based on the set of rules 500, according to an embodiment. In an embodiment, the method 400 analyzes the set of rules 500 to select hashing bit indices based on the set of rules 500. In the embodiment illustrated in FIG. 6, the example set of rules 500 includes seven rules 502 denoted as rules R1 through R7, and each of the rules 502 includes six bits 504 indexed as bits b0 through b5. Each of the rules 502 corresponds to a pattern of bits including logic zero ("0") bits, logic one ("1") bits, and don't care ("X") bits. The set of rules 500 includes suitable numbers of rules 502 other than seven rules and/or each of the rules 502 includes a suitable number of bits other than six bits, in other embodiments. In the example embodiment of FIGS. 4 and 5, the greedy algorithm includes three stages depicted as a first stage 506, a second stage 508, and a third stage 510. Accordingly, in the example embodiment of FIG. 6, the greedy algorithm selects three hashing bits based on the set of rules 500. The greedy algorithm includes other suitable numbers of stages and selects corresponding other number of hashing bits, in other embodiments.

At block 402 (FIG. 5), the module 302 calculates a number of additional duplications that would result from selection of each of the bit indices in the set or rules 500. The number of additional duplications that would result from selection of the corresponding bit is listed in FIG. 5 at a row 512. For example, if the index b0 is selected as the first hashing bit, then each of the rules R1 and R2 would need to be duplicated, while the remaining rules R3 through R7 would not need to be duplicated. In other words, only one copy of each of the rules R3 through R7 would be included in the database, and two copies of each of the rules R1 and R2 would be included in the database. Accordingly, the number of additional duplications resulting from selection of the bit b0 as the first hashing bit would result in two additional duplications (i.e., one additional copy of R1 and one additional copy of R2). Similarly selection of the bit b1 would result in two additional duplications—one additional copy of R3 and one additional copy of R4, and selection of bit b2 would result in two additional duplications—one additional copy of R5 and one additional copy of R6. On the other hand, selection of any one of the bits b3, b4 and b4 as the first portioning bit would result in only one duplication in the rules database. In particular, selection of any one of the indices b3, b4 or b5 would result in an additional copy of the rule R7 in the rules database.

At block 404 (FIG. 5), the module 302 selects (e.g., randomly or according to some selection criteria) one of the indices corresponding fewest additional duplications determined at block 402. In the example illustrated in FIG. 6, the module 302 selects the bit index b3 as the first hashing bit, as indicated in FIG. 6 by the arrow 514.

At block 406 (FIG. 5), after selection of the bit index b3 as the first hashing bit, the module 302 calculates additional duplications that would result from selection of each of the bits b0, b1, b2, b4 and b5 in combination with the bit b3 selected at block 404. As illustrated in the row 512 in the second stage 508, selection of any of the bits b0, b1 and b2 would result in on two additional duplications. Selection of any of the bits b5 and b5 would also result in two additional duplications, in the illustrated embodiment. In particular, selection of either one of the bits b4 or b5 would result in four copies of the rule R7 in the rules database, thus resulting in two additional copies with respect to selection of the index b3 in the first stage 504. Accordingly, equal number of additional duplications (two additional duplications) would result from selection of any one of the bits b0, b1, b2, b4 and b5 in combination with the bit b3 as hashing bits in the set of rules 500. Thus, the module 302 can select any of the bits b0, b1, b2, b4 and b5 to be used as a second hashing bit to be used in combination with the bit b3 selected in the first stage 506.

At block 408 (FIG. 5), the module 302 selects (e.g., randomly or according to some selection criteria) one of the indices corresponding fewest additional duplications determined at block 406. In the example illustrated in FIG. 6, the module 302 selects the index b0 as the second hashing bit of the set of hashing bits, as indicated in FIG. 6 by the arrow 516.

At block 410 (FIG. 5), the module 302 calculates additional duplications that would result from selection of each of the bits b1, b2, b4 and b5 in combination with the bits b3 and b0 selected, respectively, at blocks 404 and 408. As illustrated in the row 512 in the third stage 510, selection of any of the bits b0, b1 and b2 would result in two additional duplications. Accordingly, equal number of additional duplications (two additional duplications) would result from selection of any one of the bits b1, b2, b4 and b5 in combination with the bit b3 as hashing bits for the set of rules 500. Thus, the module 302 can select any of the bits b1, b2, b4 and b5 to be used as a third hashing bit to be used in combination with the bit b3 selected in the first stage 506 and bit b4 selected in the second stage 508.

At block 412 (FIG. 5), the module 302 selects (e.g., randomly or according to some selection criteria) one of the indices corresponding fewest additional duplications determined at block 410. In the example illustrated in FIG. 6, the module 302 selects the bit index b1 as the third hashing bit of the set of hashing bits, as indicated in FIG. 6 by the arrow 518.

Figure 7:
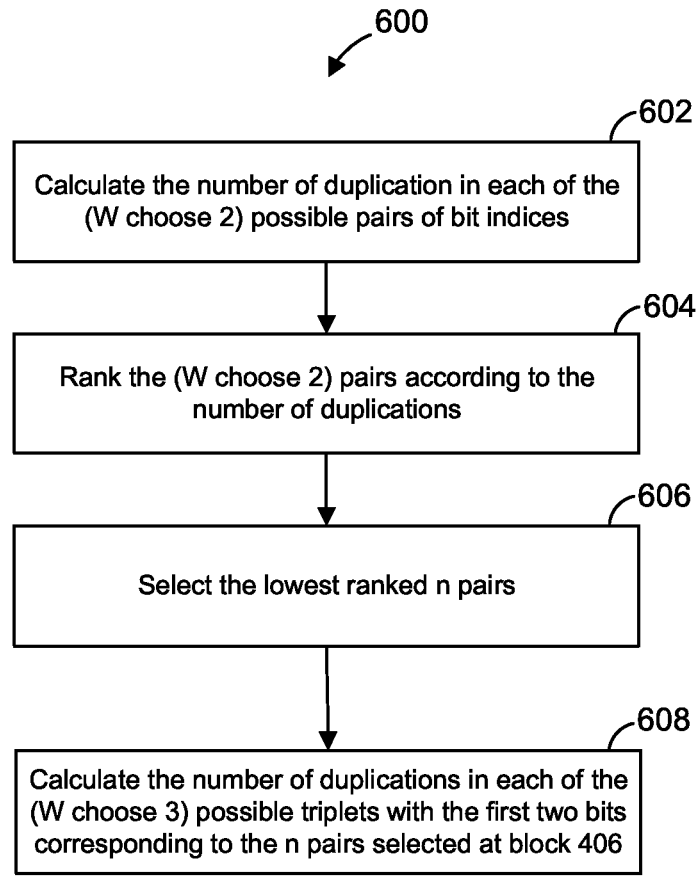
FIG. 7 is a flow chart of another method for selecting, based on a set of rules, bit indices of a subset of bits to be used as hashing bits for storing the set of rules, according to anther embodiment.

FIG. 7 is a flow chart of another method 600 for selecting, based on a set of rules, bit indices of a subset of bits to be used as hashing bits for storing the set of rules, according to anther embodiment. In an embodiment, the method 600 is implemented by the hashing bit index selection module 302 of FIG. 4. In the illustrated embodiment, the method 600 selects three hashing bit indices from possible W bit indices (e.g., for a set of rules of W bits in each of the rules). It is noted that the method 600 is easily extended to a general case in which any suitable number k (2, 4, 5, 6, etc.) of hashing bit indices is selected form a number W of possible bit indices, in various embodiments.

At block 602, for each possible of (W choose 2) pairs of bit indices, the module 302 calculates the number of duplications that would result if the pair were selected to be used as hashing bit indices. At block 604, the module 302 ranks the (W choose 2) pairs according to the number of duplications determined for the pairs at block 602. At block 606, the module 302 selects the lowest ranked n pairs of bit indices, where n is a positive integer. At block 608, the module 302 analyses triplets of bit indices, wherein the triplets of bit indices include the pairs of pits selected at block 606. Generally speaking, the method 600 is performed in several stages, where a stage i of the method 600 considers selection (i+2) bit indices based on n lowest ranked indices considered in the previous stage, which considered selection of (i+1) indices, in an embodiment.

FIGS. 8A-8F illustrate respective steps of a method 700 for distributing a set of rules among one or more segments of a rules database, according to an embodiment. In an embodiment, the method 700 is implemented by the module 304 of FIG. 4. The example method 700 distributes the set of rules 500 of FIG. 6 according to the hashing bits selected by the method 400, according to an embodiment.

Generally speaking, according to the method 700, the rules distribution module 304 analyzes the set of rules to identify subsets of rules that match different possible combination of the hashing bits in the rules. Then, for each pair of the identified subsets of rules, the rules distribution module 304 determines a number of rules in common ("shared rules") in the pair of subsets of rules. To represent the number of shared rules, the rules distribution module 304 assigns, to each pair of the subsets of rules, a weight corresponding to the number of shared rules in the pair of rules, in an embodiment. Then, the rules distribution module 304 analyzes the pairs of subsets of rules that have shared rules (i.e., the number of shared rules greater than zero) to determine whether these pairs of subsets of rules can be combined in a single segment 107, without exceeding the size of the segment 107, if the shared rules only appear once in the segment 107. In one embodiment, prior to analyzing the pairs of subsets of rules, the rules distribution module 304 ranks the pairs according to the number of shared rules in the pairs, and analyzes the pairs of subsets of rules in the order of decreasing number of shared rules. If the rules distribution module 304 determines that a pair of subsets of rules can be combined in a single segment 107, without exceeding the size of the segment 107, then the rules distribution module 304 combines the subsets of rules into a new single subset of rules, wherein the new subset of rules excludes duplications of the shared rules. The rules distribution module 304 recalculates the numbers of shared rules among subsets of pairs of rules including the new, combined, subset of rules. The steps of calculating the number of shared rules, determining whether subsets of rules having shared rules can be stored in a same segment 107 without exceeding the size of the segment 107, and combining subsets of rules into new subsets of rules when it is determined that the subsets can be combined continues until no more subsets having shared rules can be combined into a single subset to be stored in a same segment 107 without exceeding the size of the segment 107, in an embodiment.

Referring now to FIG. 8A, a table 702 lists correspondences between possible hashing bit combinations 704 and subsets 706 of rules that match the hashing bit combinations 704. According to the method 700, for each pair of the subsets 706, the rules distribution module 304 determines the number of rules in common ("shared rules") in the pair of subsets 706. For example, the pair of subsets corresponding to the bit combinations "000" and "001" have no rules in common (i.e. 0 shared rules), while the pair of subsets corresponding to the bit combinations "000" and "010" have one rule, R3, in common (i.e. one shared rule). FIG. 8A depicts a graph 708 for representing the determined number of shared rules, according to an embodiment. Graph 708 is an undirected graph with vertices 710-1 through 710-8 corresponding to the possible hashing bit combinations 704 listed in the table 702. The graph 708 is a fully connected graph with each vertex 710 connected by an edge with each other one of the vertices 710. A number of duplications corresponding to each pair of indices is indicated along the edge that connects the pair of indices. For clarity of illustration, not all of the edges are illustrated in the graph 708. In particular, branches corresponding to zero shared rules are omitted from the graph 708.

Figure 8C:
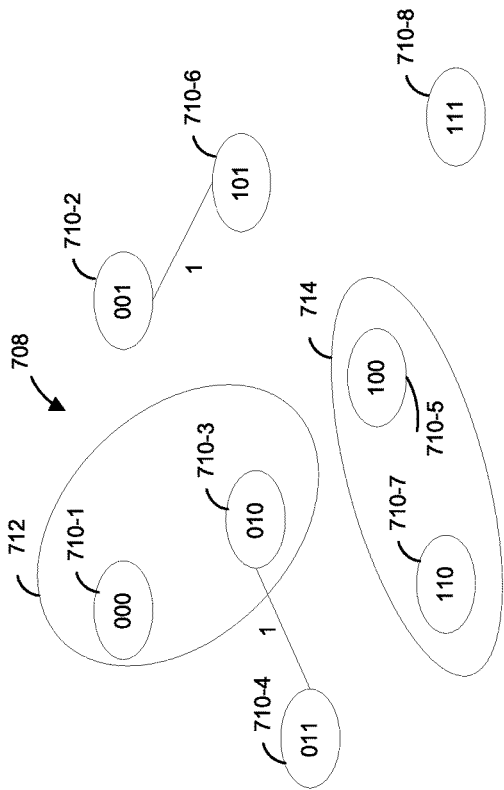

The rules distribution module 304 analyzes the subsets of rules 706 to determine whether the pairs of subsets can be combined into a single subset to be stored in a same segment 107 without exceeding the size of the subset 107. In the example of FIGS. 8A-8G, it is assumed that a maximum of five rules can be stored in each of the segments 107. Other embodiments utilize other suitable maximum numbers of rules (e.g., 2, 3, 4, 6, 7, 8, 9, 10, or any other suitable number of rules) for each of the segments 107, in some embodiments. Further, the maximum number of rules need not be same for all segments 107, and different maximum numbers of rules are used for at least some of the segments, in some embodiments. Referring now to FIG. 8B, the rules distribution module 304 combines the pair of subsets corresponding to vertices 710-1 ("000") and 710-3 ("010") into a single subset, which is represented in FIG. 8B by a vertex 712. Similarly, referring now to FIG. 8C, the rules distribution module 304 combines the pair of subsets corresponding to vertices "100" and "110" into a single subset, which is represented in FIG. 8C by a vertex 714.

Figure 8D:
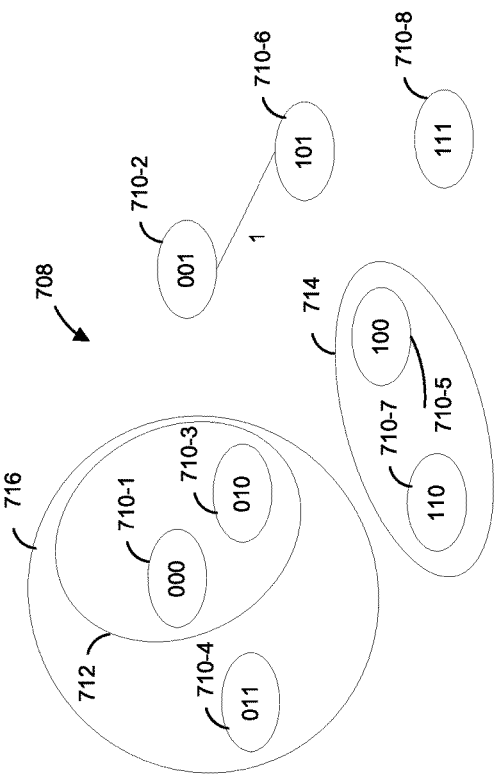
Figure 8E:
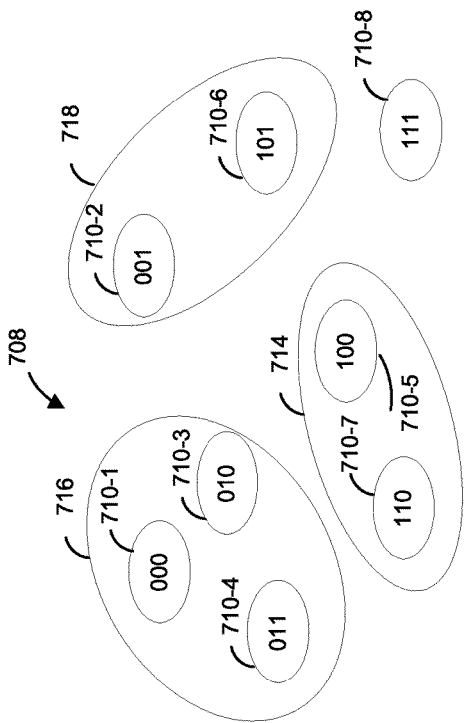
Figure 8F:
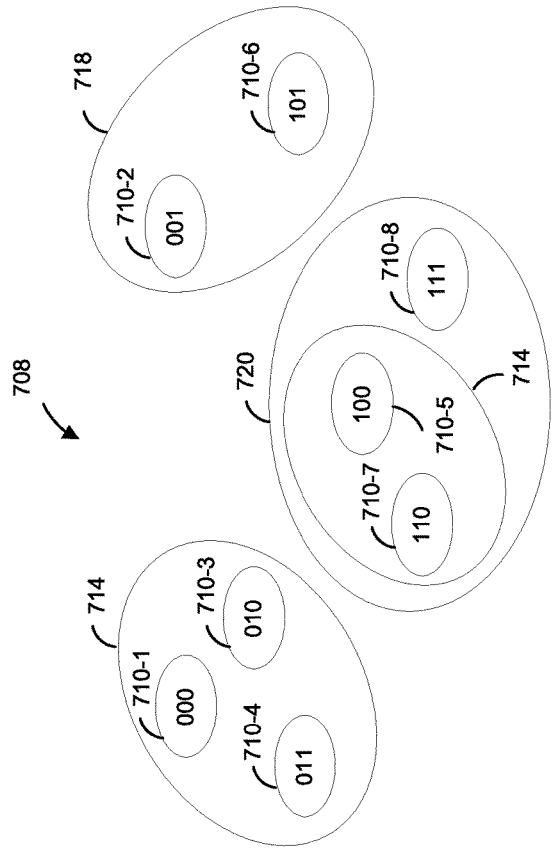
Figure 8G:
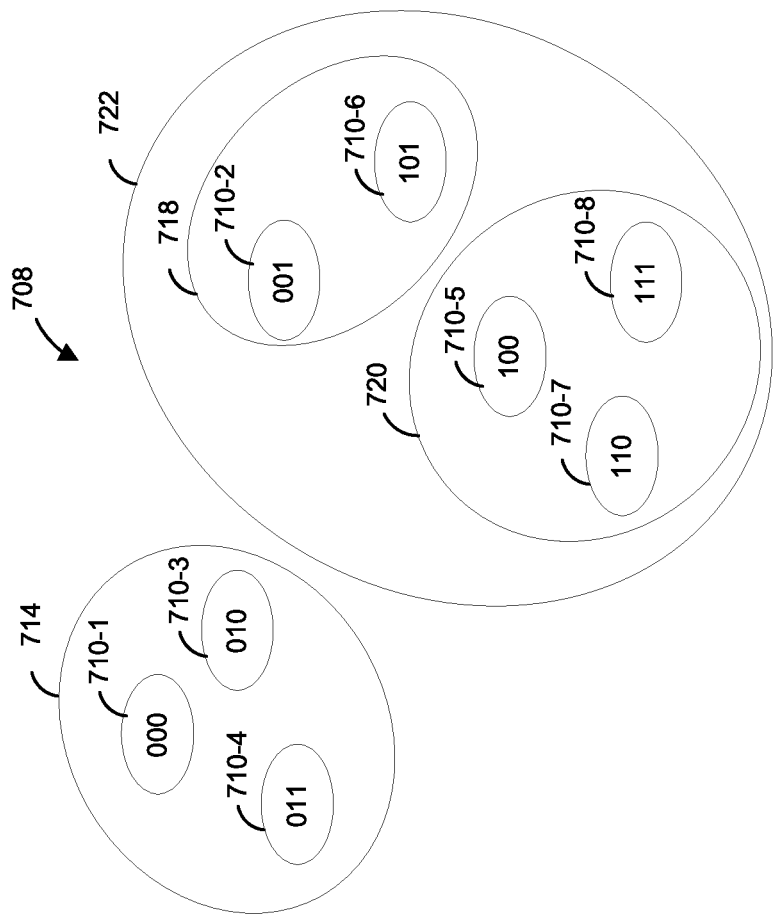

Referring to FIG. 8D, the new subset 712 created in FIG. 8B is combined with the subset corresponding to vertex 710-4 ("011") into a single subset which is represented in FIG. 8D by a vertex 716. Then, as illustrated in FIG. 8E, the rules distribution module 304 combines the pair of subsets corresponding to vertices 710-2 ("001") and 710-6 ("101") into a single subset, which is represented in FIG. 8E by a vertex 718. Then, as illustrated in FIG. 8F, the subset 714 created in FIG. 8C is combined with the subset corresponding to the vertex 710-8 ("111") into a single subset which is represented in FIG. 8D by a vertex 720. Finally, referring to FIG. 8G, the subset 718 created in FIG. 8E is combined with the subset 720 created in FIG. 8F into a single subset represented in FIG. 8G by a vertex 722. As a result of the steps of FIGS. 8A-8G, the set of rules is organized into two subsets of rules, the subset 714 corresponding to five rules R2, R3, R5, R6, and R7 and the subset 720 corresponding to three rules R1, R2, and R4. These two subsets cannot be combined without exceeding the maximum number of five rules that can be stored in a single segment 107. Accordingly, after the operations of FIG. 8G, the method 700 terminates, in an embodiment.

In some embodiments, the CAM system 120 is configured to support updates to the rules database 106, such as deletion of rules from the rules database 106, changes to rules stored in the database 106 and/or insertion of new rules into the database 106, during operation of the switching device 100. To delete a rule from the database 106, CAM system 120 deletes the rule from one or more of the segments 107 in which the rule is stored in the database 106, in an embodiment. To change one or more bits in a rule stored in the database 106, when the one or more bits to not correspond to the hashing bit indices in the rule, the CAM system 120 changes the one or more bits in the rule in one or more segments 107 in which the rule is stored, in an embodiment.

According to an embodiment, to insert a new rule into the database, the update unit determines one or more segment 107 into which to insert the new rule based on values of bits at hashing bit indices in the rule, and determines whether the identified one or more segments has space for the new rule. If each of the indentified one or more segments has space for the new rule, the CAM system 120 places the rule in each of the identified one or more segments 107, in an embodiment. On the other hand, if at least one of the one or more identified segments does not have space for the new rule, in one embodiment and/or scenario, the CAM system 120 relocates all or part of the rules in the segments, and updates the index table entries accordingly to point to the new segments. In another embodiment and/or scenario, the rules database 106 includes an additional segment 107 (not shown), and stores the new rules in the additional segment 107. In this embodiment, a lookup operation in the rules database 106 searches two segments 107. In particular, a lookup operation based on a key search the segment 107 identified by the index table 105 based on hashing bits extracted from the key, and also searches the additional segment 107 for the key. In yet another embodiment, the CAM system 120 includes an additional index table. To determine a segment 107 in which to insert a rule, the CAM system 120 accesses the additional index table based on a different subset of hashing bits compared to the subset of hashing bits used for accessing the index table 105, in an embodiment. A lookup operation for a key searches a segment 107 identified using the index table 105, and also searches a segment 107 identified using the additional index table, in this embodiment.

In yet another embodiment, segments 107 of the CAM system 120 includes respective extension fields for storing pointers to other segment 107. In this embodiment, when a segment 107 identified for inserting a rule does not have enough space for the rule, another segment 107 is allocated for inserting rules that do not fir in the identified segment 107, and the extension field of the identified segment is set to pint to the allocated segment 107. The rule is then inserted in the allocated segment 107. A rules that hash to a segment 107 having an extension field that already contains a pointer to another segment 107 are inserted into the segment 107 pointed to by the extension field of the segment of this segment does not have enough space for the rule provided that the pointed-to segment has enough space for the rule. On the other hand, if the pointed-to segment does not have enough space for the rule, a new segment 107 id allocated for storing the rule, and the extension field of the pointed-to segment is set to point to the new allocated segment 107, thereby creating a linked chain of segments 107, in an embodiment. In an embodiment, a lookup operation for a key searches a segment 107 identified for the key according to the hashing bits in the key. If the key is not found in the identified segment 107, the segment pointed to by the extension field of the identified segment is searched, in an embodiment.

In some embodiments, the CPU 114 is configured to periodically redistribute the rules stored in the database 106 according to the hashing bit selection and/or rule distribution techniques of the present disclosure to efficiently distribute the rules after insertions, deletions, and/or updates of the rules into the rules database 106.

Figure 9:
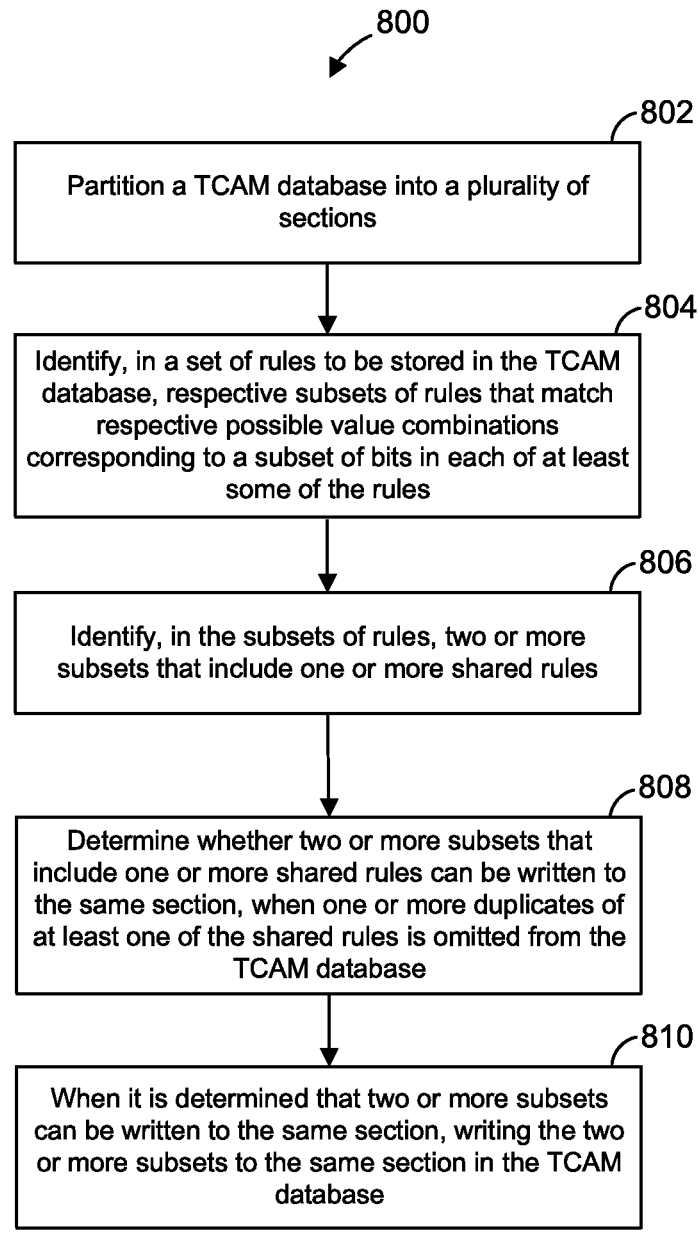
FIG. 9 is a flow diagram of a method for operating a TCAM database in a network device.

FIG. 9 is a flow diagram of a method 800 for operating a TCAM database in a network device. In an embodiment, the method 800 is implemented by the switching device 100 of FIG. 1. For example, the method 800 is implemented at least partially by the packet processor 102 in conjunction with the CPU 114 of FIG. 1, in an embodiment. In other embodiments, the method 700 is implemented by other suitable components of the switching device 100 or by another suitable network device.

At block 802, a TCAM database is partitioned into a plurality of sections. For example, the TCAM database is partitioned into a plurality of segments 107, as depicted in FIG. 1, in an embodiment. At block 804, a set of rules to be stored in the TCAM database is analyzed. For example, the set of rules 500 of FIG. 6 is analyzed at block 804, in one embodiment. Other suitable sets of rules are analyzed at block 804 in other embodiments. In an embodiment, block 804 includes identifying, in the set of rules, respective subsets of rules that match respective possible value combinations corresponding to a subset of bits in each of at least some of the rules. For example, block 804 includes identifying, in the set of rules, respective subsets of rules that match respective possible value combinations of a fixed set of three bits in each of the rules, as illustrated in the table 70 of FIG. 8A, in an example embodiment.

At block 806, the subsets of rules identified at block 804 are analyzed to identify two or more subsets of rules that include one or more shared rules. At block 808, it is determined whether the two or more subsets of rules that include shared rules can be written to a same section when one or more duplicates of the shared rules is omitted from the TCAM database. In an embodiment, the method 700 described above with respect to FIGS. 8A-8G is used to identify two or more subsets of rules that include one or more shared rules at block 806 and to determine whether the two or more subsets of rules that include shared rules can be written to a same section when one or more duplicates of the shared rules is omitted from the TCAM database at block 808. In other embodiments, other suitable methods are used to identify two or more subsets of rules that include one or more shared rules at block 806 and to determine whether the two or more subsets of rules that include shared rules can be written to a same section when one or more duplicates of the shared rules is omitted from the TCAM database at block 808.

At block 808, when it is determined that the two or more subsets of rules that include shared rules can be written to a same section, the two or more subsets or rules are written to the same section. Writing the two or more subsets to the same section allows the shared rules to be written only once to the TCAM database, in an embodiment. Thus, duplications of the shared rules are avoided in the TCAM database, thereby reducing the size required to store the set of rules in the TCAM database, in at least some embodiments.

In some embodiments, the method 700 further includes generating a key for a network packet, identifying a section of the TCAM database in which to search for the key, and searching only the identified section of the TCAM database to check whether the key matches any rule stored in the identified section. Searching only the identified section results in a reduced power consumption of the TCAM database compared to monolithic systems in which the entire database is searched based on a key, in such embodiments.

The various blocks, operations, etc., described above are implemented in hardware, such as in one or more custom integrated circuits, application specific integrated circuits (ASICs), field programmable gate arrays (FPGAs), etc., in some embodiments. The various blocks, operations, etc., described above are implemented using a processor executing machine readable software and/or firmware instructions, in some embodiments.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for storing information for processing packets into a ternary content addressable memory (TCAM) in a network device, wherein the TCAM is partitioned into a plurality of sections, and each section has a corresponding size that defines a corresponding maximum number of data patterns that can be stored in the section, the method comprising:

determining a correspondence between values of a set of lookup bits and the plurality of sections of the TCAM so that respective values of the set of lookup bits correspond to respective sections of the TCAM, wherein the lookup bits correspond to at least one of i) information included in packets, and ii) information generated by the network device during processing of packets by the network device;

for each of a plurality of data patterns associated with processing packets, assigning the data pattern to each section of the TCAM for which a fixed set of bits in the data pattern matches a corresponding value of the set of lookup bits, wherein the data patterns correspond to
rules for processing packets at the network device, and
at least one of i) information included in packets, and
ii) information generated by the network device during
processing of packets by the network device;
identifying, with a processor, multiple pairs of sets of data
patterns i) that have been assigned to respective pairs of
sections of the TCAM and ii) that include respective
one or more identical data patterns that have been
assigned to multiple sections of the TCAM;
determining, with the processor, two sets of data patterns,
among the multiple pairs of sets of data patterns, having
a highest number of identical data patterns;
determining, with the processor, whether a total number
of data patterns in a combined set of the determined two
sets of data patterns, the combined set including only
one instance of each identical data pattern, exceeds the
maximum number of data patterns for the single section
of the TCAM;
in response to determining that the total number of data
patterns in the combined set of the two sets of data
patterns does not exceed the maximum number of data
patterns for the single section of the TCAM,
combining, with the processor, the two sets of data
patterns to form the combined set so that only one
instance of each identical data pattern is included in
the combined set, wherein the combined set is
assigned to only the single section of the TCAM, and
revising, with the processor, the correspondence
between values of the set of lookup bits and the
plurality of sections of the TCAM so that the two
different values of the set of lookup bits correspond
to the only the single section of the TCAM;
repeating, with the processor, the operations of determining
two sets of data patterns, determining whether a
total number of data patterns in a combined set of the
determined two sets of data patterns exceeds the maximum
number of data patterns for a single section of the
TCAM, combining the two sets, and revising the correspondence,
one or more times; and
storing, with the processor, each data pattern to the section
of the TCAM to which the data pattern is assigned.

2. The method of claim 1, wherein:
determining the correspondence between values of the set
of lookup bits and the plurality of sections of the
TCAM comprises configuring a table having first
entries that indicate values of the set of lookup bits and
corresponding second entries that indicate sections of
the TCAM; and
revising the correspondence between values of the set of
lookup bits and the plurality of sections of the TCAM
comprises revising the table.

3. The method of claim 1, wherein assigning data patterns
to sections of the TCAM includes:
comparing a fixed set of bits in each data pattern to the
respective values of the set of lookup bits, and
assigning the data pattern to each section for which the
fixed set of bits in the data pattern matches the corresponding
value of the set of lookup bits.

4. The method of claim 1, wherein repeating the operations
of determining two sets of data patterns, determining
whether a total number of data patterns in a combined set of
the determined two sets of data patterns exceeds the maximum
number of data patterns for a single section of the
TCAM, combining the two sets, and revising the correspondence
one or more times includes repeating the operations of
determining two sets of data patterns, determining whether
a total number of data patterns in a combined set of the
determined two sets of data patterns exceeds the maximum
number of data patterns for a single section of the TCAM,
combining the two sets, and revising the correspondence
until it is determined either i) that there are no two sets of
data patterns assigned to two sections of the TCAM that
include one or more identical data patterns, or ii) that there
are no two sets of data patterns having a total number of data
patterns that does not exceed the maximum number for a
single section of the TCAM.

5. The method of claim 1, further comprising, after storing
each data pattern to the section of the TCAM to which the
data pattern is assigned, performing one or more of (i)
deleting one or more data patterns from the TCAM, (ii)
modifying at least one data pattern in the TCAM, and (iii)
inserting at least one additional data pattern into the TCAM.

6. The method of claim 1, further comprising selecting the
set of lookup bits based on the group of data patterns.

7. The method of claim 6, wherein selecting the set of
lookup bits based on the group of data patterns comprises:
selecting a particular set of lookup bits that minimize a
number of duplicate instances of data patterns that, as
a result of assigning the data patterns to sections of the
TCAM, are assigned to different sections of the TCAM.

8. The method of claim 1, wherein the method is also for
processing packets using the data patterns in the TCAM, and
the method further comprises:
generating a key using header information of a network
packet;
using a set of bits in the key to identify a particular section
of the TCAM that is to be searched; and
searching only the particular section of the TCAM using
the key.

9. The method of claim 8, wherein:
determining the correspondence between values of the set
of lookup bits and the plurality of sections of the
TCAM comprises configuring a table having first
entries that indicate values of the set of lookup bits and
corresponding second entries that indicate sections of
the TCAM;
revising the correspondence between values of the set of
lookup bits and the plurality of sections of the TCAM
comprises revising the table;
using the set of bits in the key to identify the particular
section of the TCAM that is to be searched comprises
comparing the set of bits in the key to the first entries
in the table.

10. A network apparatus, comprising:
a plurality of ports;
a packet processor coupled to the plurality of ports, the
packet processor configured to process packets
received via at least some of the ports, wherein the
packet processor comprises a ternary content addressable
memory (TCAM) to store data patterns associated
with processing packets, wherein the TCAM is partitioned
into a plurality of sections, and each section has
a corresponding size that defines a corresponding maximum
number of data patterns that can be stored in the
section; and
a processor coupled to the packet processor, the processor
configured to:
determine a correspondence between values of a set of
lookup bits and the plurality of sections of the
TCAM so that respective values of the set of lookup
bits correspond to respective sections of the TCAM,
wherein the lookup bits correspond to at least one of
i) information included in packets, and ii) information generated by the packet processor during processing of packets by the packet processor;

for each of a plurality of data patterns, assigning the data pattern to each section of the TCAM for which a fixed set of bits in the data pattern matches a corresponding value of the set of lookup bits, wherein the data patterns correspond to rules for processing packets at the packet processor, and at least one of i) information included in packets, and ii) information generated by the packet processor during processing of packets by the packet processor;

identify multiple pairs of sets of data patterns i) that have been assigned to respective pairs of sections of the TCAM and ii) that include respective one or more identical data patterns that have been assigned to multiple sections of the TCAM;

determine two sets of data patterns, among the multiple pairs of sets of data patterns, having a highest number of identical data patterns;

determine whether a total number of data patterns in a combined set of the determined two sets of data patterns, the combined set including only one instance of each identical data pattern, exceeds the maximum number of data patterns for the single section of the TCAM;

in response to determining that the total number of data patterns in the combined set of the two sets of data patterns in does not exceed the maximum number of data patterns for the single section of the TCAM,
  combine the two sets of data patterns to form the combined set so that only one instance of each identical data pattern is included in the combined set, wherein the combined set is assigned to only the single section of the TCAM, and
  revise the correspondence between values of the set of lookup bits and the plurality of sections of the TCAM so that the two different values of the set of lookup bits correspond to the only the single section of the TCAM;

repeat the acts of determining two sets of data patterns, determining whether a total number of data patterns in a combined set of the determined two sets of data patterns exceeds the maximum number of data patterns for a single section of the TCAM, combining the two sets, and revising the correspondence one or more times; and store each data pattern to the section of the TCAM to which the data pattern is assigned.

11. The network apparatus of claim 10, wherein the processor is configured to:
  determine the correspondence between values of the set of lookup bits and the plurality of sections of the TCAM at least by configuring a table having first entries that indicate values of the set of lookup bits and corresponding second entries that indicate sections of the TCAM; and
  revise the correspondence between values of the set of lookup bits and the plurality of sections of the TCAM at least by revising the table.

12. The network apparatus of claim 10, wherein the processor is configured to:
  compare a fixed set of bits in each data pattern to the respective values of the set of lookup bits; and
  assign the data pattern to each section for which the fixed set of bits in the data pattern matches the corresponding value of the set of lookup bits.

13. The network apparatus of claim 10, wherein the processor is configured to repeat the acts of determining two sets of data patterns, determining whether a total number of data patterns in a combined set of the determined two sets of data patterns exceeds the maximum number of data patterns for a single section of the TCAM, combining the two sets, and revising the correspondence until it is determined either i) that there are no two sets of data patterns assigned to two sections of the TCAM that include one or more identical data patterns, or ii) that there are no two sets of data patterns having a total number of data patterns that does not exceed the maximum number for a single section of the TCAM.

14. The network apparatus of claim 10, wherein the processor is configured to, after storing each data pattern to the section of the TCAM to which the data pattern is assigned, one or more of (i) delete one or more data patterns from the TCAM, (ii) modify at least one data pattern in the TCAM, and (iii) insert at least one additional data pattern into the TCAM.

15. The network apparatus of claim 10, wherein the processor is configured to select the set of lookup bits based on the group of data patterns.

16. The network apparatus of claim 15, wherein the processor is configured to select the set of lookup bits based on the group of data patterns at least by:
  selecting a particular set of lookup bits that minimize a number of duplicate instances of data patterns that, as a result of assigning the data patterns to sections of the TCAM, are assigned to different sections of the TCAM.

17. The network apparatus of claim 10, wherein the packet processor is configured to:
  generate a key using header information of a network packet;
  use a set of bits in the key to identify a particular section of the TCAM that is to be searched; and
  search only the particular section of the TCAM using the key.

18. The network apparatus of claim 17, wherein the processor is configured to:
  determine the correspondence between values of the set of lookup bits and the plurality of sections of the TCAM at least by configuring a table having first entries that indicate values of the set of lookup bits and corresponding second entries that indicate sections of the TCAM;
  revise the correspondence between values of the set of lookup bits and the plurality of sections of the TCAM at least by revising the table; and
  use the set of bits in the key to identify the particular section of the TCAM that is to be searched at least by comparing the set of bits in the key to the first entries in the table.

19. The network apparatus of claim 10, further comprising a memory coupled to the processor;
  wherein the processor is configured to execute instructions stored in the memory.

* * * * *